(12) United States Patent
Bartell et al.

(10) Patent No.: US 6,411,730 B1
(45) Date of Patent: Jun. 25, 2002

(54) HISTOGRAM FOR GENERATING A PALETTE OF COLORS

(75) Inventors: Jason T. Bartell, Mountain View; Christopher B. Cox, San Jose, both of CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/232,054

(22) Filed: Jan. 15, 1999

(51) Int. Cl.$^7$ ................................................ G06K 9/00
(52) U.S. Cl. ........................................ 382/168; 358/522
(58) Field of Search ...................... 382/162, 164–165, 382/168, 170; 358/522

(56) References Cited

U.S. PATENT DOCUMENTS 5,307,182 A * 4/1994 Maltz .......................... 358/518
5,809,165 A * 9/1998 Massen ........................ 382/168
6,246,790 B1 * 6/2001 Huang et al. ............... 382/162

OTHER PUBLICATIONS

James D. Foley, et al., *Computer Graphics: Principles and Practice*, 2nd Ed., 599–600, No Date.
Raja Balasubramanian, et al., Color–image quantization with use of a fast binary splitting technique, Opt. Soc. Am., Nov. 1994, 2777–2786.

(List continued on next page.)

*Primary Examiner*—Bhavesh Mehta

(74) *Attorney, Agent, or Firm*—Fish & Richardson P.C.

(57) ABSTRACT

Methods and apparatus that generate data structures representing the frequency with which colors occur in a collection of colors, such as occurs in a raster image. The invention provides a list consisting essentially of first generation entries and combines first generation entries to form a list consisting essentially of second generation entries. Each first generation entry has an associated color set of one or more colors. Each first generation entry represents the frequency with which colors in the associated color set appear in the image. The color sets for all of the first generation entries are mutually non-intersecting. Particular embodiments have the following features. Each second generation color set corresponds to a volume of the color space. All second generation color sets have the same size. The second generation entries can be combined to form a list of third generation entries. A list of entries is used to generate a palette In another aspect, the invention features a method of generating a histogram. The method includes (a) dividing the color space into a set of disjoint volumes; (b) for each occurrence of a color in the collection of colors, (i) identifying the volume in which the color is found, (ii) providing an entry associated with the identified volume in a list of entries, where each entry is associated with exactly one distinct volume, and (iii) updating the frequency data of the entry; (c) before all occurrences in the collection have been processed, (i) redividing the color space into a current set of larger, disjoint volumes, (ii) combining original entries in the list so that each resulting entry is associated with exactly one distinct volume and combines the frequency data of the original entries that were combined to form the resulting entry, and (iii) continuing the processing of step (b); and (d) generating a color frequency histogram from the newest entries in the list.

23 Claims, 7 Drawing Sheets

OTHER PUBLICATIONS

S.J. Wan, et al., *An Algorithm for Multidimensional Data Clustering*, ACM Transactions on Mathematical Software, 14(2), Jun. 1988, 153–162.

Paul S. Heckbert, "Color Image Quantization for Frame Buffer Display", No Date http://www.pecah.srv.cs.cmu.edu/afs/cs.cmu.edu/user/ph/www/ciq_thesis.

Equilibrium—DeBabelizer Pro 4.5 Complete Features, http://www.equilibrium.com/ProductInfo/features.html, No Date.

Octree Quantization of 24–bit Color Images, http://fox.eng.uiowa.edu/adip/hw1, No Date.

An Overview of Color Quantization Techniques, http://www.cs.wpi.edu/~matt/courses/cs563/talks/color_quant/CQhead.html, No Date.

Octree Color Quantization, http://www.cubic.org/source/sourcerer/octree.htm, No date.

Gervautz, M. & Purgathofer, W., A Simple Method for Color Quantization: Octree Quantization, *Graphics Gems*, (Academic Press 1990).

Kevin Christiansen and William Barrett: *An Improved Method for Color Quantization*, IEEE Data Compression Conference (DCC '93).

* cited by examiner

FIG._5B Empty Histogram

| Index (a,b) | Count |
|---|---|
|  |  |
|  |  |
|  |  |
|  |  |
|  |  |
|  |  |
|  |  |

FIG._5C Histogram 1

| Index (a,b) | Count |
|---|---|
| (1,3) | 2 |
| (2,1) | 2 |
| (2,2) | 1 |
| (4,3) | 3 |
| (6,2) | 3 |
| (7,1) | 3 |
| (7,2) | 3 |

FIG._5D Histogram 2

| Index (a,b) | Count |
|---|---|
| (1,3) | 2 |
| (2,1) | 2 |
| (2,2) | 1 |
| (4,3) | 3 |
| (5,3) | 1 |
| (6,2) | 3 |
| (7,1) | 3 |
| (7,2) | 3 |

56a

FIG._5E Histogram 3

| Index (2a,2b) | Count |
|---|---|
| (0,1) | 2 |
| (1,0) | 2 |
| (1,1) | 1 |
| (2,1) | 4 |
| (3,0) | 3 |
| (3,1) | 6 |

FIG._5F Histogram 4

| Index (2a,2b) | Count |
|---|---|
| (0,1) | 2 |
| (1,0) | 2 |
| (1,1) | 1 |
| (2,1) | 4 |
| (3,0) | 3 |
| (3,1) | 6 |
| (4,2) | 1 |

HISTOGRAM FOR GENERATING A PALETTE OF COLORS

BACKGROUND

The present invention relates generally to processing and displaying digital images. A digital image is a raster of rows and columns of picture elements, or "pixels." The color of a given pixel is defined in accordance with a "color space," which provides a data representation for a range of colors (a "color gamut") in terms of basic color components (or "colorants"). A pixel's color is generally represented by a series of bits (the "color value"), with specific bits indicating the amount of each colorant used in the color. The specific colorants depend on the color system used. For example, in the CMYK color system, colors are represented as combinations of values for cyan (C), magenta (M), yellow (Y), and key (K) (generally black); in an RGB color system, colors are represented as combinations of values for red (R), green (G), and blue (B); and in the HSV color system, colors are represented as combinations of values for hue (H), saturation (S) and value (V). Thus, a 24-bit RGB data representation may allocate bits 0–7 to indicate the amount of red, bits 8–15 to indicate the amount of green, and bits 16–23 to indicate the amount of blue. Such a representation can produce a pixel in any one of nearly 17 million different pixel colors (i.e., the number of unique combinations of 256 intensity values of red, green, and blue). By contrast, systems that allocate fewer bits of memory to storing color data can produce only images having a limited number of colors. For example, an 8-bit color image can include only 256 different colors.

Although digital images are often created using 24 bits of color information, images are often compressed or "quantized" to conserve memory and decrease processing times. A typical digital image, even one created using 24 bits to store color information, may include only a relatively small number of colors. For more complex images, quantization (usually from 24 bit to 8 bit color) necessarily results in the loss of color resolution, raising the questions what set or palette of colors to use to display the image (a "display palette"), and how to map the remaining or "missing" image colors into the display palette.

One approach is to use a predetermined display palette and a fixed mapping from image colors to display palette. For example, an RGB color space may be divided into 256 equal-sized color regions and one display palette color may be selected from each region. The image may then be mapped into the display palette, with the missing colors being mapped to the closest color in the display palette (measured by proximity in an RGB color space).

Another approach is to select the display palette based on the actual distribution of colors in the image (often called "adaptive palettes"). For example, a "popularity algorithm" may be used to create a histogram of colors in the image and select the most frequent colors to use as the display palette. In this approach, the color space is again divided into a number of equal-sized regions—for example, 32,768 or more regions, corresponding to 32 or more divisions on each color axis in an RGB color space. The image colors are mapped to the region they fall in, and the 256 most popular regions are selected. One display palette color is selected from each of these 256 regions, and the image is mapped to the display palette with missing colors being mapped to the closest color in the display palette.

In a related approach, the quantization algorithm begins with an initial histogram stored as a list of colors in the image. Upon reaching a predetermined memory limit, the algorithm defaults to a low resolution histogram of predetermined size. This low resolution histogram is then used to generate a palette of colors to display the image as described above.

Another alternative is the use of an "octree" algorithm to obtain a palette of the K most popular colors in the image, where K is a predetermined number of "leaves" in the tree. In this method, the colors of the image are sequentially read into the octree and associated color counts are stored in leaves. For each new color, if the tree has fewer than K leaves with non-zero counts, the color is filtered down the tree until it reaches the leaf corresponding to the color. If the tree already has K leaves, a set of leaves are merged to make room in the tree for the new color. After the entire image has thus been processed, the display palette consists of the set of representative colors associated with each leaf, and the image is mapped to that palette.

SUMMARY

The invention provides methods for generating data structures representing the frequency with which colors occur in a collection of colors, such as occurs in a raster image, and apparatus (include computer program products) implementing or embodying the methods of the invention.

In general, in one aspect, the invention features a method of generating a data structure representing the frequency with which colors occur in a raster image. The method includes providing a list consisting essentially of first generation entries, each first generation entry having an associated color set of one or more colors, each first generation entry representing the frequency with which colors in the associated color set appear in the image, the color sets for all of the first generation entries being mutually non-intersecting; and combining first generation entries to form a list consisting essentially of second generation entries.

Implementations of the invention can include one or more of the following advantageous features. Each first generation entry and second generation entry includes an index identifying the color set. Each color set corresponds to a volume in a color space. The frequency is represented as a count. Each second generation entry has an associated second generation color set of one or more colors, each second generation entry representing the frequency with which colors in the associated color set appear in the image, the color sets for all of the second generation entries being mutually non-intersecting. Each second generation color set corresponds to a volume of the color space. All second generation color sets are of the same size. The method also includes using the list of second generation entries to generate a palette representing the colors in the image. The method also includes combining second generation entries to form a list consisting essentially of third generation entries. Each third generation entry has an associated third generation color set of one or more colors, where each third generation entry represents the frequency with which colors in the associated color set appear in the image, and the color sets for all of the third generation entries are mutually non-intersecting. The method also includes using the list of third generation entries to generate a palette representing the colors in the image.

In general, in another aspect, the invention features a method of generating a histogram for a collection of colors in which any color may occur zero, one, or more times, where the colors are selected from a range of color values in a color space. The method includes dividing the range of color values using an first set of divisions to define a first set of disjoint, uniform volumes in the color space; providing a first list consisting essentially of first generation entries, each first generation entry being associated with exactly one distinct volume of the first set of volumes; storing in an entry frequency data representing the frequency with which a color value within the associated volume occurs in the collection of colors; dividing the range of color values using a second set of divisions to define a second set of disjoint, uniform volumes in the color space; and creating a second list from the first list, the second list consisting essentially of second generation entries, each second generation entry being associated with exactly one distinct volume of the second set of volumes and storing combined frequency data for color values in the associated volume.

Implementations of the invention can include one or more of the following advantageous features. Each division is orthogonal to an axis of the color space. The second set of divisions is a proper subset of the first set of divisions (i.e., the second set includes fewer elements than the first set). The second set of divisions is the first set of divisions minus a subset consisting of mutually parallel divisions. The second set of divisions is the first set of divisions minus a subset of divisions, and for each axis of the color space, the subset includes at least one division orthogonal to the axis. The color space is an RGB (red green blue) color space and each division is a plane orthogonal to either the red axis, the green axis, or the blue axis of the color space. Each volume in the second set of volumes is the union of two or more volumes in the first set of volumes. The method further includes dividing the range of color values using a third set of divisions to define a third set of disjoint, uniform volumes in the color space; and creating a third list from the second list, the third list consisting essentially of third generation entries, each third generation entry being associated with exactly one distinct volume of the third set of volumes and storing combined frequency data for color values in the associated volume.

In general, in another aspect, the invention features a computer program on a computer-readable medium for generating a data structure representing the frequency with which colors occur in a collection of colors in which any color may occur zero, one, or more times, and the colors are selected from a range of color values in a color space. The program includes instructions to divide the range of color values using an first set of divisions to define a first set of disjoint, uniform volumes in the color space; to provide a first list consisting essentially of first generation entries, each first generation entry being associated with exactly one distinct volume in the first set of volumes; to store in an entry frequency data representing the frequency with which a color value within the volume associated with the entry occurs in the collection of colors; to divide the range of color values using a second set of divisions to define a second set of disjoint, uniform volumes in the color space; and to create a second list from the first list, the second list consisting essentially of second generation entries, each second generation entry being associated with exactly one distinct volume of the second set of volumes and storing combined frequency data for color values in the associated volume.

Implementations of the invention can include one or more of the following advantageous features. The program further includes instructions to divide the range of color values using a third set of divisions to define a third set of disjoint, uniform volumes in the color space; and to create a third list from the second list, the third list consisting essentially of third generation entries, each third generation entry being associated with exactly one distinct volume of the third set of volumes and storing combined frequency data for color values in the associated volume. The program further includes instructions to use the third list to generate a palette representing the color values in an image defining the collection of colors.

In general, in another aspect, the invention features a method of generating a histogram for a collection of colors in which any color may occur zero, one, or more times, where the colors are selected from a range of color values in a color space. The method includes (a) dividing the color space into a set of disjoint volumes, each volume encompassing one or more colors in the color space; (b) for each occurrence of a color in the collection of colors, (i) identifying the volume in which the color is found, (ii) providing an entry associated with the identified volume in a list of entries, each entry in the list being associated with exactly one distinct volume and having frequency data representing the frequency with which colors in the associated volume occur in the collection, and (iii) updating the frequency data of the entry; (c) before all occurrences in the collection have been processed, (i) redividing the color space into a current set of larger, disjoint volumes, each larger volume being the union of two or more smaller volumes of the previously-defined set of volumes, (ii) combining original entries in the list so that each resulting entry in the list is associated with exactly one distinct volume of the current set of volumes and combines the frequency data of the original entries that were combined to form the resulting entry, and (iii) continuing the processing of step (b); and (d) generating a color frequency histogram from the newest entries in the list.

Implementations of the invention can include one or more of the following advantageous features. Step (c) is performed multiple times. The method further includes detecting a performance condition; and performing step (c) when the performance condition is detected. The performance condition is a memory limit condition. The performance condition is a list search time condition. The performance condition is a list insert time condition.

Among the advantages of the invention are the following. Using a histogram of colors in the original image to generate a display palette results in display palettes that more accurately reflect the colors in the original image. As a result, distortion of colors in the displayed image is minimized. In addition, varying the resolution of the histogram in response to a performance or quality condition, such as a limit in available memory, processing speed to search or insert new colors into the histogram, avoids arbitrary and unnecessary loss of color information during color quantization. Instead, loss of color information is minimized by gradually decreasing color resolution only as much as necessary to address performance constraints, producing a displayed image with better color resolution.

Another advantage is that the histogram can be stored as a sorted sparse list of colors in the image. This can result in significant storage savings and rapid processing times. In particular, this provides for the rapid identification of an entry that includes a given color in the image.

Another advantage is that color resolution may be decreased in any one or more dimensions in a color space. This selectivity in the loss of color resolution provides the opportunity to preserve resolution in dimensions that are more significant in the image.

Another advantage of the invention is that it is not restricted to any particular color space.

Other features and advantages will become apparent from the following description, including the drawings and the claims.

DETAILED DESCRIPTION

Figure 1:
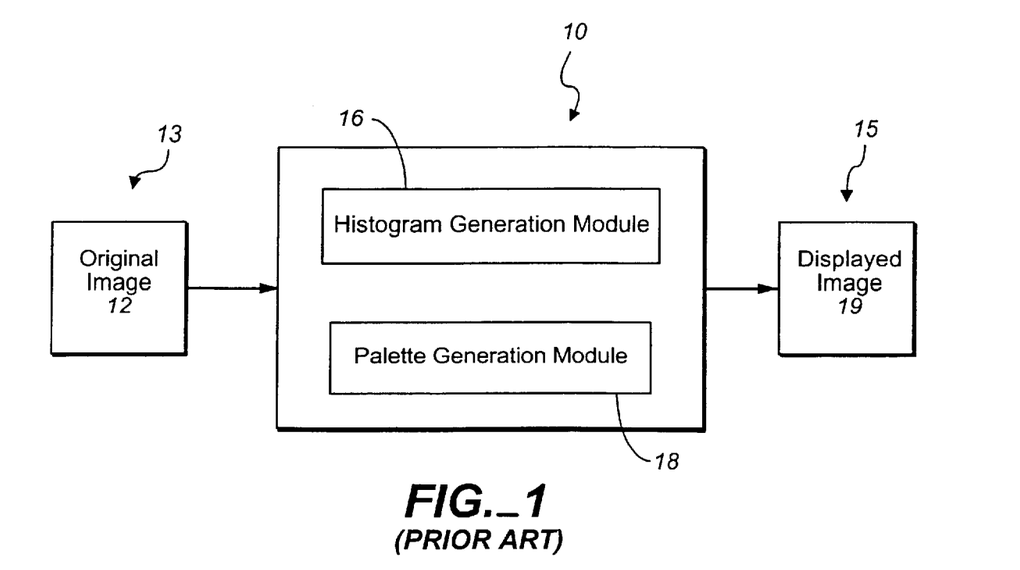
FIG. 1 is a block diagram of an image display system.

FIG. 1 shows an image display system 10 for displaying a digital image. Original image 12 is generated in graphics environment 13. Image display system 10 determines how original image 12 will appear when displayed in a display graphics environment 15, which is capable of displaying fewer colors than are generated in graphics environment 13. The image display system 10 includes a histogram generation module 16 and a palette generation module 18. Histogram generation module 16 generates a histogram of colors in original image 12. Palette generation module 18 generates a display palette containing fewer colors than are available in graphics environment 13. This is used to generate the displayed image 19.

Figure 2A:
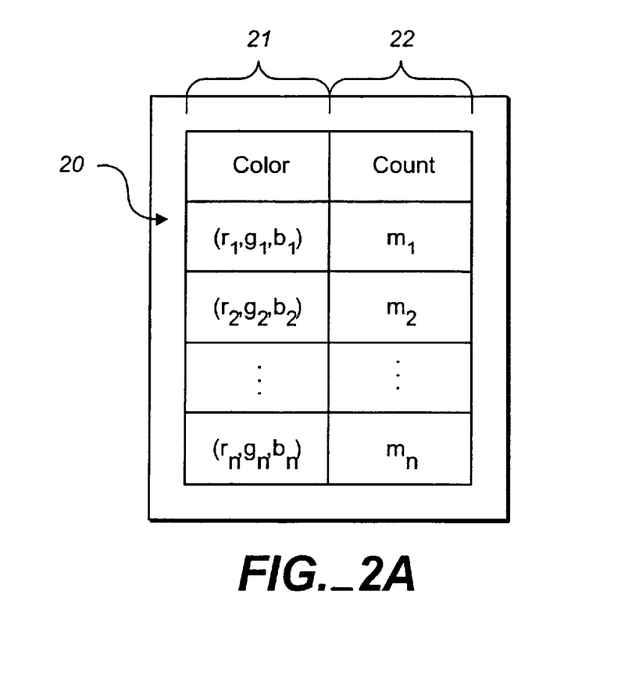
FIG. 2a is a schematic diagram illustrating the representation of a histogram as a sparse list.
Figure 2B:
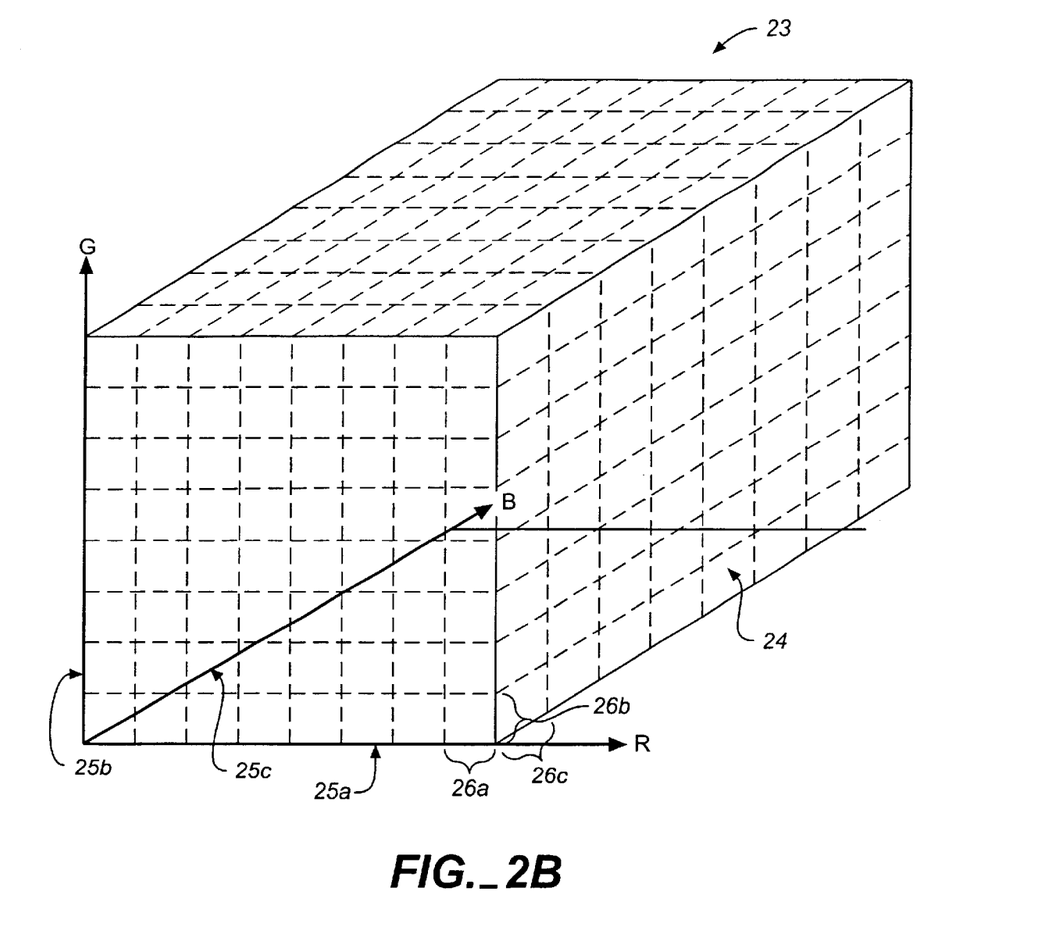
FIG. 2b is a schematic diagram illustrating the division of the RGB color space of contiguous, non-overlapping volumes.

Referring to FIGS. 2a and 2b, a histogram 20 of colors in an image is represented as a sparse list of pixel counts for each available color. For a 24 bit color image, most colors are not used in a given image, so most entries in histogram 20 have pixel counts of zero. Accordingly, histogram 20 is stored as a list of (index,count) pairs corresponding to an index 21 representing a color set comprising a color or colors in original image 12 and the pixel count 22 associated with each index. The maximum number of the entries in the list (represented by subscript n in FIG. 2a) may be predetermined based on the amount of memory allocated to list 20. Alternatively, the number of list entries may be allowed to vary within the constraints of available memory.

Each list entry represents a volume in the color space defining the image. As shown in FIG. 2b, for an image in the RGB color space, the color space 23 is divided into a series of contiguous, non-overlapping volumes 24—in this case cubes or rectangular prisms—with edges in each colorant axis 25a–25c (i.e., one dimension corresponding to red, one to green and one to blue). In this embodiment, each volume has the same edge length 26a–26c in each colorant. Alternatively, the color space may be divided into volumes having different edge lengths in one or more colorants, or into volumes of different sizes. For an image in the CMYK color space, each volume is a regular four dimensional prism with edges corresponding to the cyan (C), magenta (M), yellow (Y) and key (K) axes. Regardless of the color space in question, each list entry corresponds to a single volume in the color space.

Figure 3:
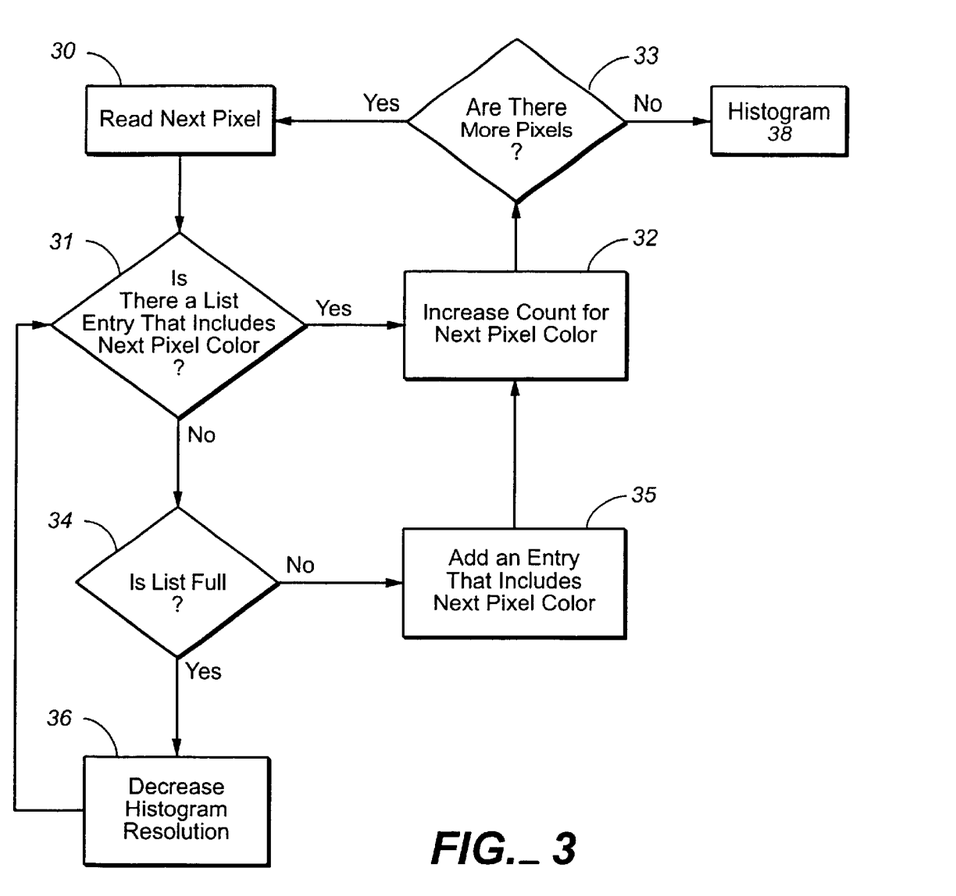
FIG. 3 is a flow diagram of a method of dynamically generating a histogram.

Referring to FIG. 3, in a method of initially dividing a color space, the image display system 10 reads the color of the next pixel in original image 12 (step 30) and determines whether the list includes an entry for that pixel color (step 31). If the list contains an entry including the color, the count is increased for that color (step 32) and the system proceeds to the next pixel (step 33). If the list does not contain an entry including the color (step 31) and is not full (i.e., it contains less than the maximum number of entries) (step 34), an entry for the appropriate volume including the color is added to the list (step 35), and the system proceeds to the next pixel (step 33). If the list does not contain an entry including the color (step 31) and if the list is full (step 34), the resolution of the histogram is decreased (step 36). If the decrease in histogram resolution does not yield a histogram that contains an entry for the volume including the color (step 31) and the resulting histogram remains full (step 34), image display system 10 decreases the histogram resolution again (step 36) until there are fewer than the maximum number of entries in the list. Image display system 10 then adds an entry to the list for the volume including the pixel color (steps 35 and 32) and proceeds to the next pixel (step 33). The system repeats this process until it has iterated through all of the pixels in the image and thereby generated a list, histogram 38, containing entries including each color in the image. This histogram is then used to generate a display palette for displaying the image on any conventional output device.

Figure 4:
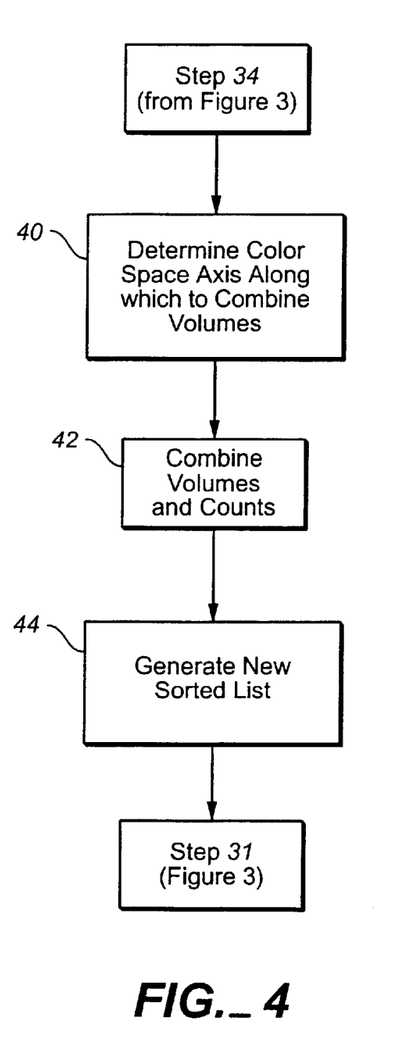
FIG. 4 flow diagram of a method of decreasing the resolution of a histogram.

FIG. 4 illustrates a method of decreasing the resolution of (or "coalescing") the histogram. In response to a performance limit indication—which may include, for example, an indication that the list is full (a memory limit condition) (step 34 from FIG. 3), that the processing time required to search the list (a list search time condition) or insert additional colors (a list insert time condition) has risen above a threshold, or that some other statistical condition makes it desirable to decrease histogram resolution (a statistical condition)—the system identifies one or more color component axis or axes along which to coalesce the histogram (step 40). For example, the system may select the axis or axes in the color space that best minimizes any perceptual error that may result from the decrease in color resolution. The system then generates a new series of color space volumes by increasing the size of the volumes in each selected color axis (step 42). In one embodiment, the volume size is uniformly increased by a factor of two along one or more axes, so that each volume in the new series is thus a combination of two or more volumes in the previous series. However, the volume size could be increased by some other factor. In another embodiment, the volume size is increased non-uniformly, for example, by combining only those neighboring volumes associated with relatively smaller counts. The count for each newly expanded volume is obtained by combining the counts of the volumes that were combined to yield the expanded volume. This yields a new list (step 44), each entry of which now includes a set of colors in the original image, and a combined count for that set of colors.

The system then sorts the list and determines whether it now contains an entry including the pixel color in question (step 31). As described above, if the list contains such an entry, the system increases the count for that entry (step 32) and proceeds to the next pixel (step 33). If the list does not contain such an entry (step 31) and is no longer full (step 34), the system adds an entry that includes the pixel color (step 35) and proceeds to the next pixel (step 33). If the list does not contain the appropriate entry (step 31) but remains full (step 34), the system initiates another coalesce cycle (step 36), decreasing the resolution of the histogram as described above.

The histogram generation method is illustrated in two dimensions in FIG. 5A–5F, for an image created with a total of 8 bits of color information (4 bits in each dimension). Color space 50 is initially divided into 256 boxes (51) with edges 52a and 52b along color axes 53a and 53b, respectively. First, system 10 creates an empty histogram, FIG. 5B with a maximum of 8 entries. After iterating though the first 17 pixels 54, system 10 yields sorted Histogram 1, FIG. 5C, with seven entries. When it reaches pixel 55, system 10 determines that Histogram 1 has no entry corresponding the color of pixel 55 (step 31). Since Histogram 1 is not yet full (i.e., it has less than 8 entries) (step 34), system 10 adds an entry to Histogram 1 (step 35), which, after sorting, yields Histogram 2, FIG. 5D, with an entry 56a for the volume that includes the color of pixel 55 and a count of 1.

Figure 5A:
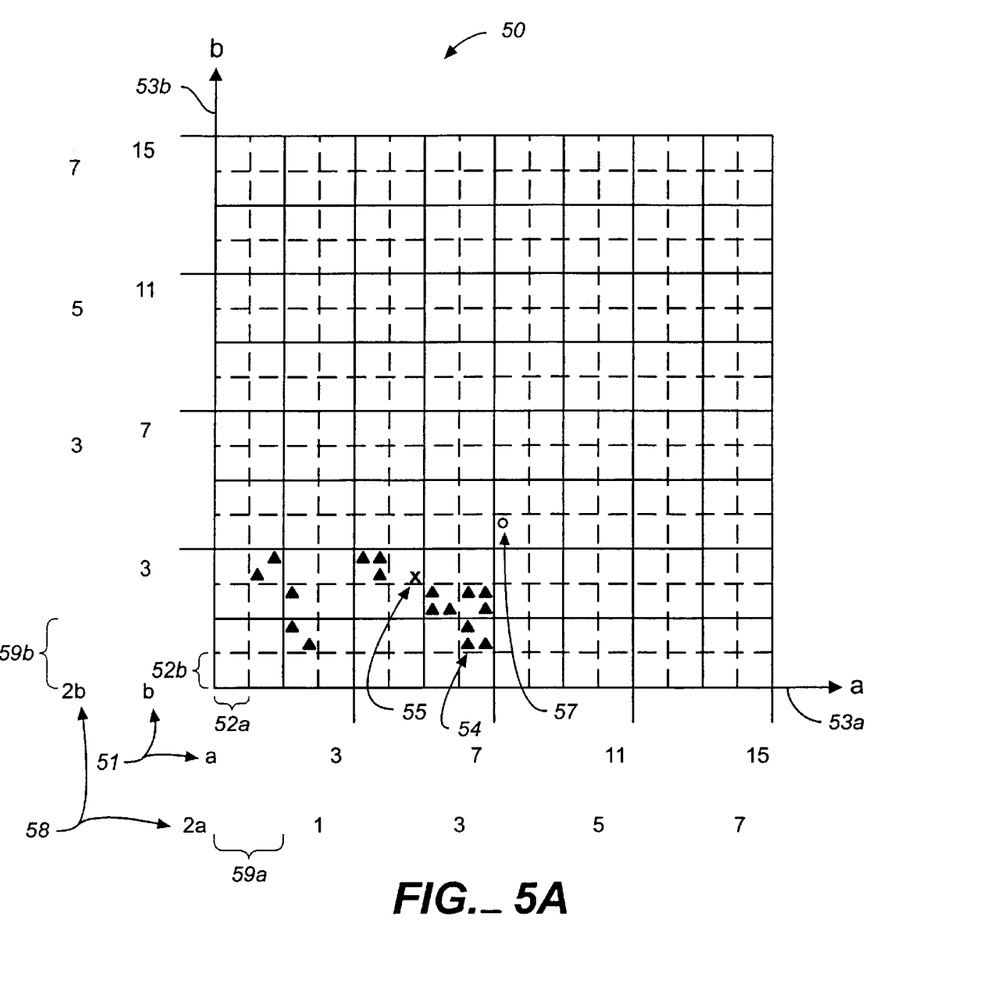
FIGS. 5A–5F are schematic diagrams illustrating the method of decreasing the resolution of the histogram.
Figure 5B:
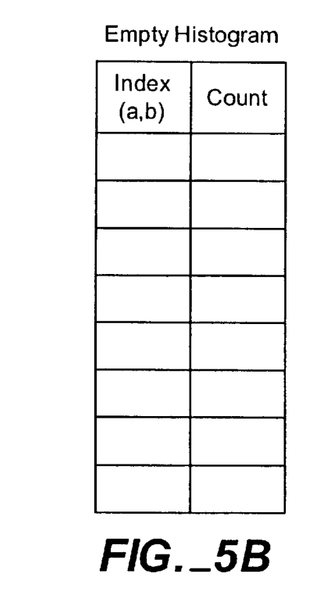
Figure 5C:
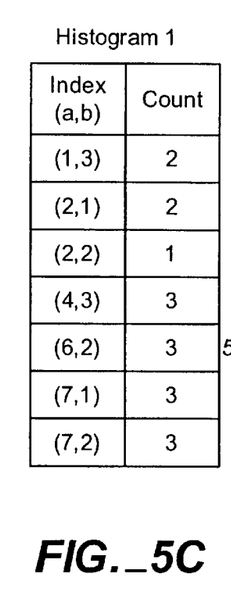
Figure 5D:
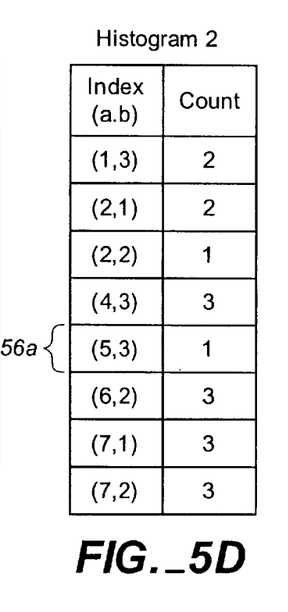
Figure 5E:
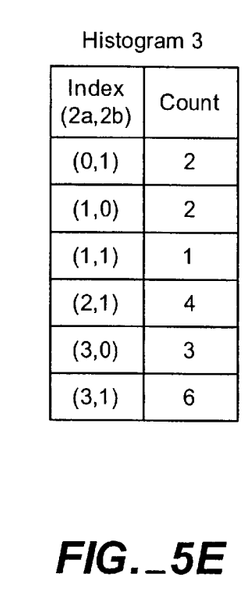
Figure 5F:
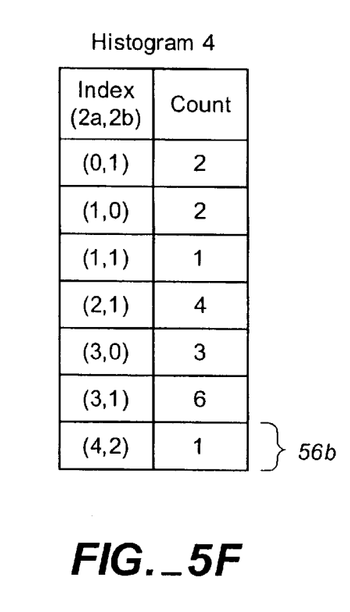

System 10 next turns to pixel 57. Upon determining that Histogram 2 does not contain an entry that includes the color of pixel 57 (step 31), system 10 attempts to add an entry including that color. However, Histogram 2 is full (step 34), so system 10 must compress the histogram, decreasing the resolution of the list defining Histogram 2 (step 36). To do so, system 10 doubles the box size along axes 53a and 52b (step 42), producing a new series of boxes 58 with edges 59a and 59b, and a corresponding new sorted Histogram 3, FIG. 5E (step 44). After determining that Histogram 3 does not contain an entry that includes the color of pixel 57 (step 31) and that Histogram 3 is not full (step 34), system 10 adds an entry 56b that includes the color of pixel 57 (step 35), creating Histogram 4, FIG. 5F. This process is repeated until system 10 has iterated through all pixels in the image; the resulting histogram is used to generate a display palette for the image.

Figure 6:
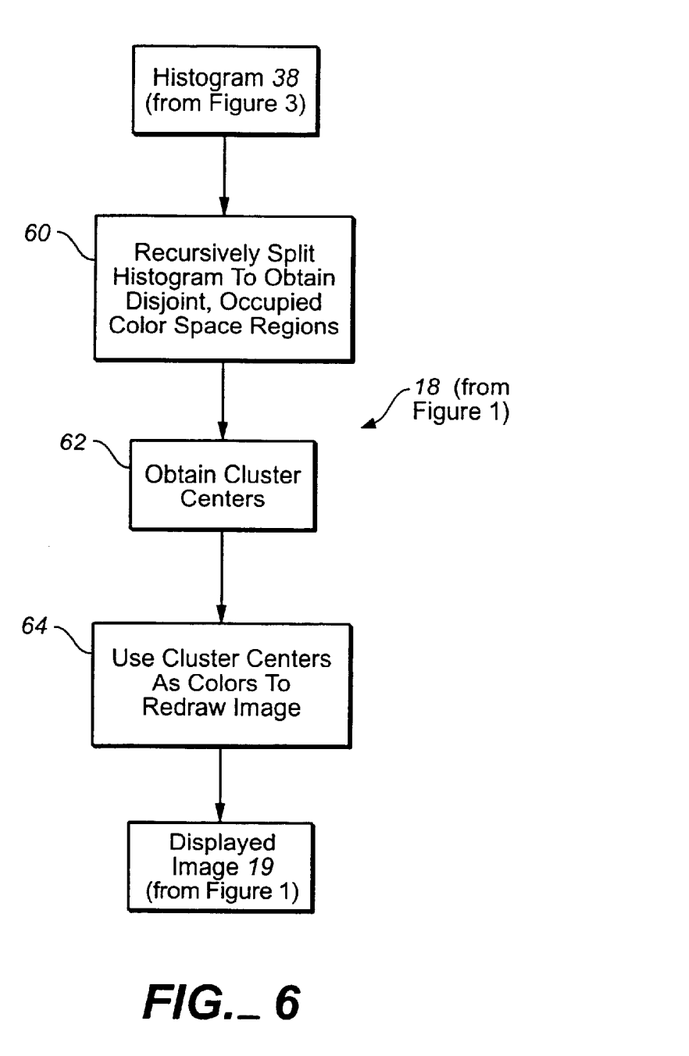
FIG. 6 is a flow diagram of a method of display palette generation.

Referring to FIG. 6, the histogram 38, generated according to the method described above, may be used to generate a display palette using any conventional palette generating method. According to one such method, the histogram is recursively subdivided using an octree algorithm to define a predetermined number of disjoint regions in the color space, for example, 256 regions (step 60). Taking the average of the points in each region then yields 256 cluster centers (step 62). These cluster centers are used to define 256 colors for an 8 bit display palette, which is used to redraw the image (step 64).

As described above, the invention enables image display system 10 to generate a display palette for a single image. The invention also applies to the generation of a display palette for a group or set of images, such as for a video or multimedia presentation.

Figure 7:
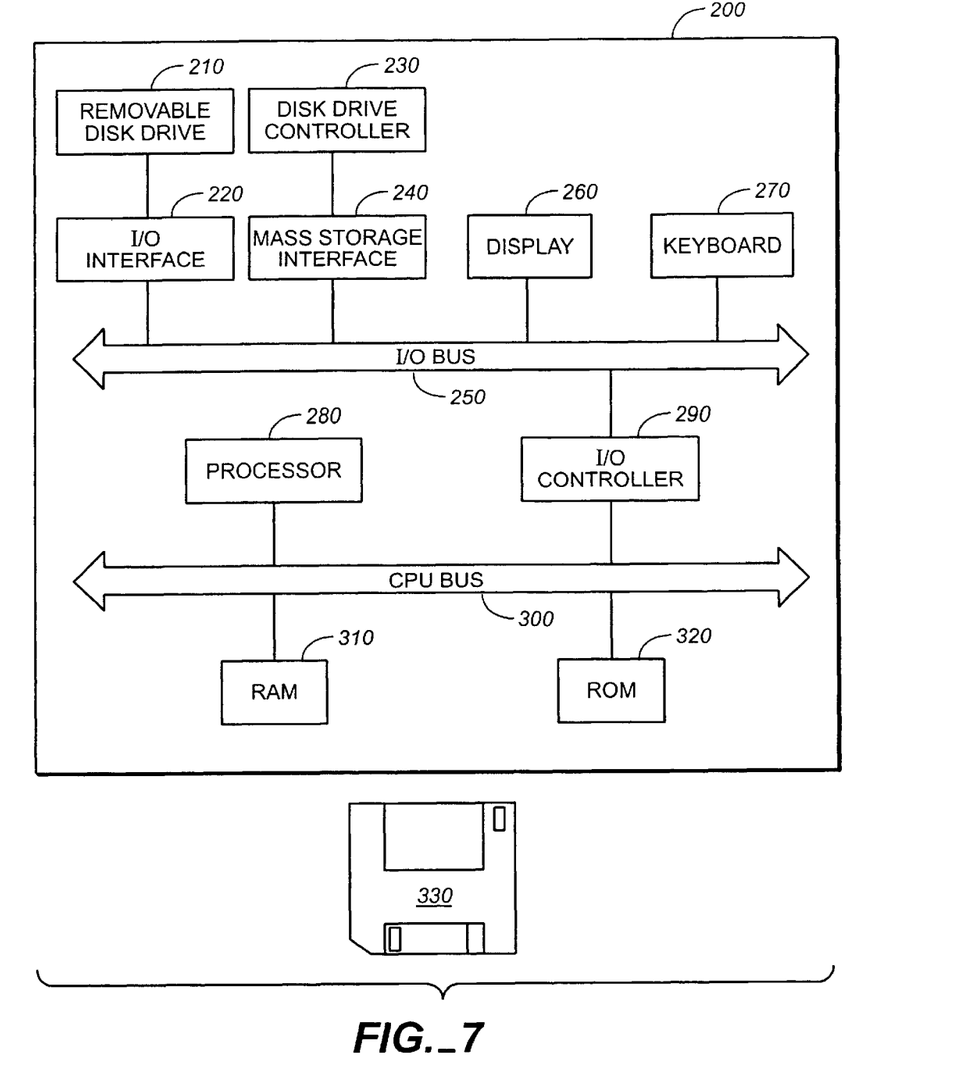
FIG. 7 is a diagram of computer platform suitable for executing the image display system.

Referring to FIG. 7, the histogram generation method is implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output.

Suitable processors 280 include, by way of example, both general and special purpose microprocessors. Generally, a processor will receive instructions and data from a read-only memory (ROM) 320 and/or a random access memory (RAM) 310 through a CPU bus 300. A computer can generally also receive programs and data from a storage medium such as an internal disk 230 operating through a mass storage interface 240 or a removable disk 210 operating through an I/O interface 220. The flow of data over an I/O bus 250 to and from I/O devices 210, 230, 260, 270 and the processor 280 and memory 310, 320 is controlled by an I/O controller. User input is obtained through a keyboard 270, mouse, stylus, microphone, trackball, touch-sensitive screen, or other input device. These elements will be found in a conventional desktop or workstation computer as well as other computers suitable for executing computer programs implementing the methods described here, which may be used in conjunction with any digital print engine or marking engine, display monitor 260, or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 230 and removable disks 210; magneto-optical disks; and CD-ROM disks. Any of the foregoing may be supplemented by, or incorporated in, specially-designed ASICs (application-specific integrated circuits).

Although elements of the invention are described in terms of a software implementation, the invention may be implemented in software or hardware or firmware, or any combination of the three.

The present invention has been described in terms of one embodiment. Other embodiments are within the scope of the claims.

What is claimed is:

1. A method of generating a histogram for a collection of colors in which any color may occur zero, one, or more times, the colors being selected from a range of color values in a color space, the method comprising:

dividing the range of color values using a first set of divisions to define a first set of disjoint, uniform volumes in the color space;

providing a first list consisting essentially of first generation entries, each first generation entry being associated with exactly one distinct volume of the first set of volumes;

storing in an entry frequency data representing the frequency with which a color value within the associated volume occurs in the collection of colors;

dividing the range of color values using a second set of divisions to define a second set of disjoint, uniform volumes in the color space; and creating a second list from the first list, the second list consisting essentially of second generation entries, each second generation entry being associated with exactly one distinct volume of the second set of volumes and storing combined frequency data for color values in the associated volume.

2. The method of claim 1, wherein each division is orthogonal to an axis of the color space.

3. The method of claim 1, wherein the second set of divisions is a proper subset of the first set of divisions.

4. The method of claim 1, wherein the second set of divisions is the first set of divisions minus a subset consisting of mutually parallel divisions.

5. The method of claim 1, wherein the second set of divisions is the first set of divisions minus a subset of divisions, wherein for each axis of the color space, the subset comprises at least one division orthogonal to the axis.

6. The method of claim 1, wherein the color space is the RGB (red green blue) color space and each division is a plane orthogonal to either the red axis, the green axis, or the blue axis of the color space.

7. The method of claim 1, wherein each volume in the second set of volumes is the union of two or more volumes in the first set of volumes.

8. The method of claim 1, further comprising dividing the range of color values using a third set of divisions to define a third set of disjoint, uniform volumes in the color space; and creating a third list from the second list, the third list consisting essentially of third generation entries, each third generation entry being associated with exactly one distinct volume of the third set of volumes and storing combined frequency data for color values in the associated volume.

9. A computer program on a computer-readable medium for generating a data structure representing the frequency with which colors occur in a collection of colors in which any color may occur zero, one, or more times, the colors being selected from a range of color values in a color space, the program comprising instructions to:

divide the range of color values using an first set of divisions to define a first set of disjoint, uniform volumes in the color space;

provide a first list consisting essentially of first generation entries, each first generation entry being associated with exactly one distinct volume in the first set of volumes;

store in an entry frequency data representing the frequency with which a color value within the volume associated with the entry occurs in the collection of colors;

divide the range of color values using a second set of divisions to define a second set of disjoint, uniform volumes in the color space; and create a second list from the first list, the second list consisting essentially of second generation entries, each second generation entry being associated with exactly one distinct volume of the second set of volumes and storing combined frequency data for color values in the associated volume.

10. The computer program of claim 9, wherein each division is orthogonal to an axis of the color space.

11. The computer program of claim 9, wherein the second set of divisions is a proper subset of the first set of divisions.

12. The computer program of claim 9, wherein the second set of divisions is the first set of divisions minus a subset of mutually parallel divisions.

13. The method of claim 9, wherein the second set of divisions is the first set of divisions minus a subset of divisions, wherein for each axis of the color space, the subset comprises at least one division orthogonal to the axis.

14. The computer program of claim 9, wherein each volume in the second set of volumes is the union of two or more volumes in the first set of volumes.

15. The computer program of claim 13, further comprising instructions to use the second list to generate a palette representing the color values in an image defining the collection of colors.

16. The computer program of claim 13, further comprising instructions to:

divide the range of color values using a third set of divisions to define a third set of disjoint, uniform volumes in the color space; and create a third list from the second list, the third list consisting essentially of third generation entries, each third generation entry being associated with exactly one distinct volume of the third set of volumes and storing combined frequency data for color values in the associated volume.

17. The computer program of claim 16, further comprising instructions to use the third list to generate a palette representing the color values in an image defining the collection of colors.

18. A method of generating a histogram for a collection of colors in which any color may occur zero, one, or more times, the colors being selected from a range of color values in a color space, the method comprising:

(a) dividing the color space into a set of disjoint volumes, each volume encompassing one or more colors in the color space;

(b) for each occurrence of a color in the collection of colors, (i) identifying the volume in which the color is found, (ii) providing an entry associated with the identified volume in a list of entries, each entry in the list being associated with exactly one distinct volume and having frequency data representing the frequency with which colors in the associated volume occur in the collection, and (iii) updating the frequency data of the entry;

(c) before all occurrences in the collection have been processed, (i) redividing the color space into a current set of larger, disjoint volumes, each larger volume being the union of two or more smaller volumes of the previously-defined set of volumes, (ii) combining original entries in the list so that each resulting entry in the list is associated with exactly one distinct volume of the current set of volumes and combines the frequency data of the original entries that were combined to form the resulting entry, and (iii) continuing the processing of step (b); and (d) generating a color frequency histogram from the newest entries in the list.

19. The method of claim 18, wherein:

step (c) is performed multiple times.

20. The method of claim 18, further comprising:

detecting a performance condition; and performing step (c) when the performance condition is detected.

21. The method of claim 20, wherein the performance condition is a memory limit condition.

22. The method of claim 20, wherein the performance condition is a list search time condition.

23. The method of claim 20, wherein the performance condition is a list insert time condition.

* * * * *

UNITED STATES PATENT AND TRADEMARK OFFICE
CERTIFICATE OF CORRECTION

PATENT NO. : 6,411,730 B1
DATED : June 25, 2002
INVENTOR(S) : Jason T. Bartell and Christopher B. Cox It is certified that error appears in the above-identified patent and that said Letters Patent is hereby corrected as shown below:

<u>Title page,</u>
Item [57], ABSTRACT,
Line 16, after "palette", please insert a period -- . --

Signed and Sealed this

Fifteenth Day of July, 2003

JAMES E. ROGAN
*Director of the United States Patent and Trademark Office*